Patented Mar. 3, 1953

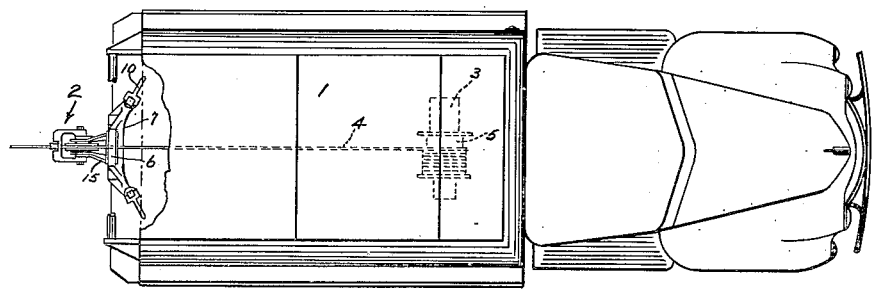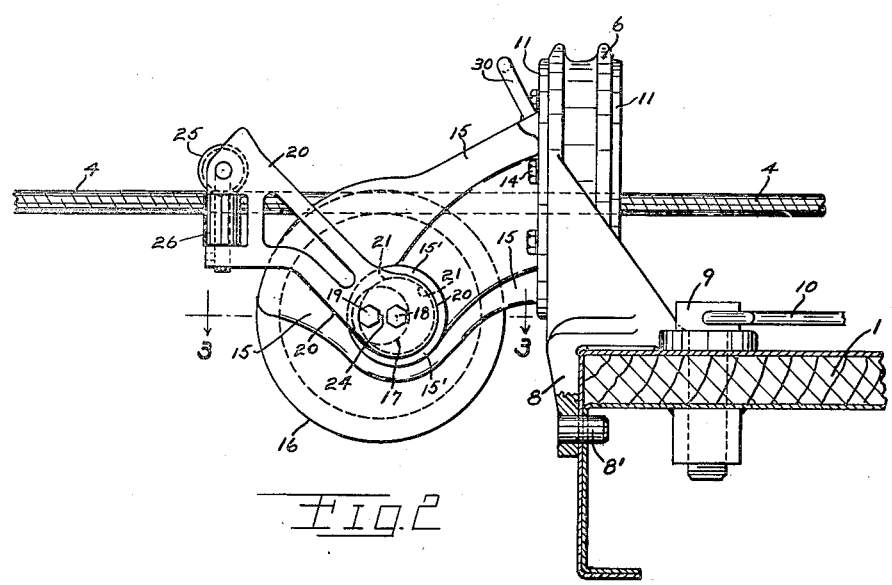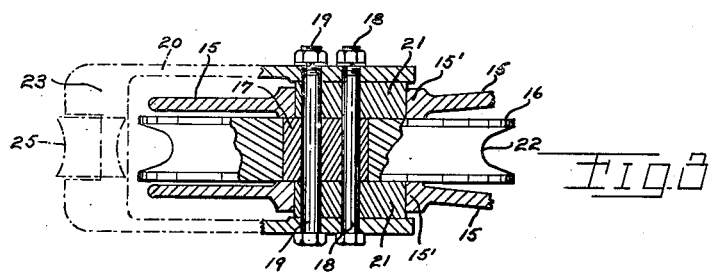
INVENTORS
HERMAN J. TROCHE
JAMES HOWARD HOLAN
BY
George W. Saywell
ATTORNEY

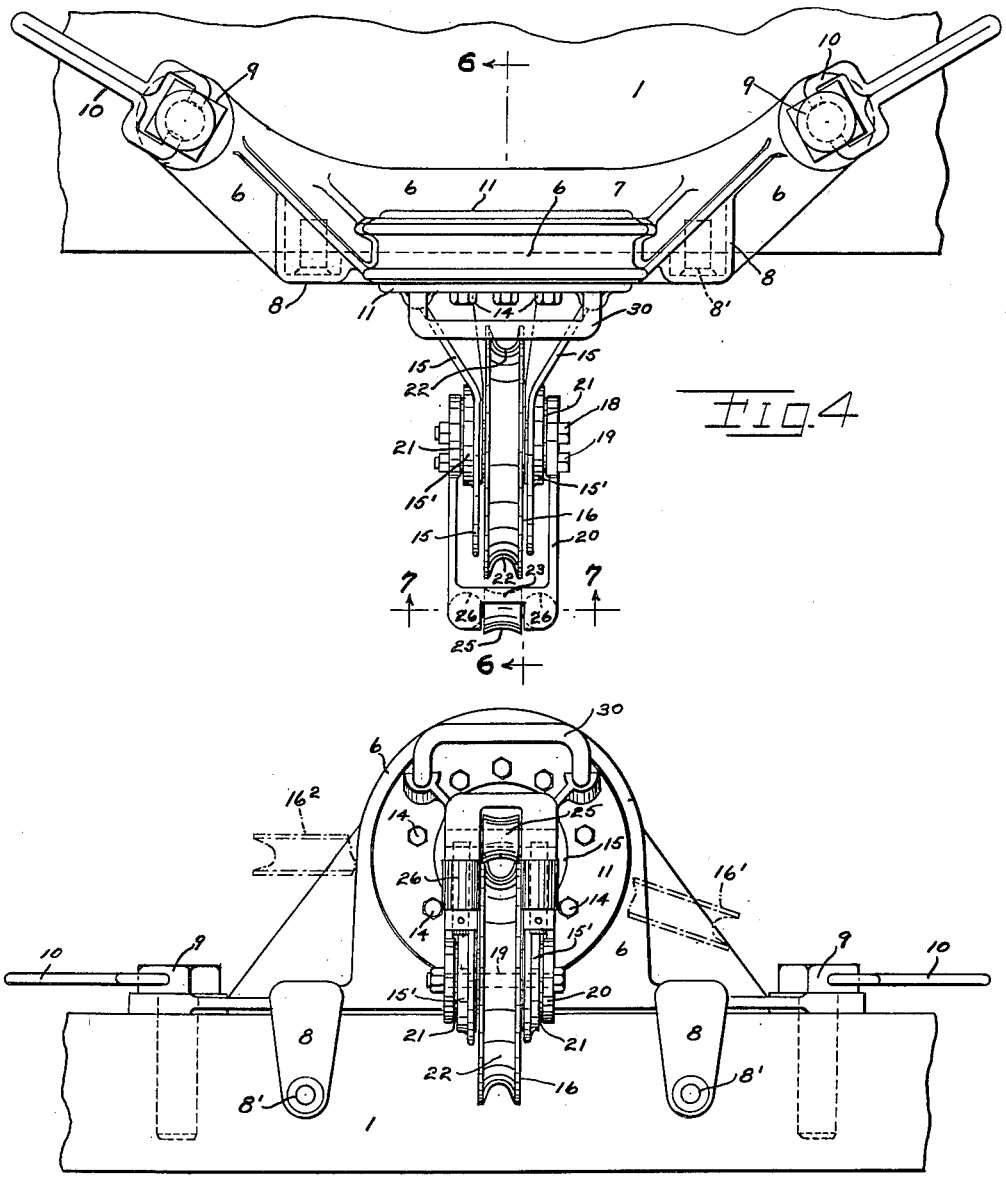

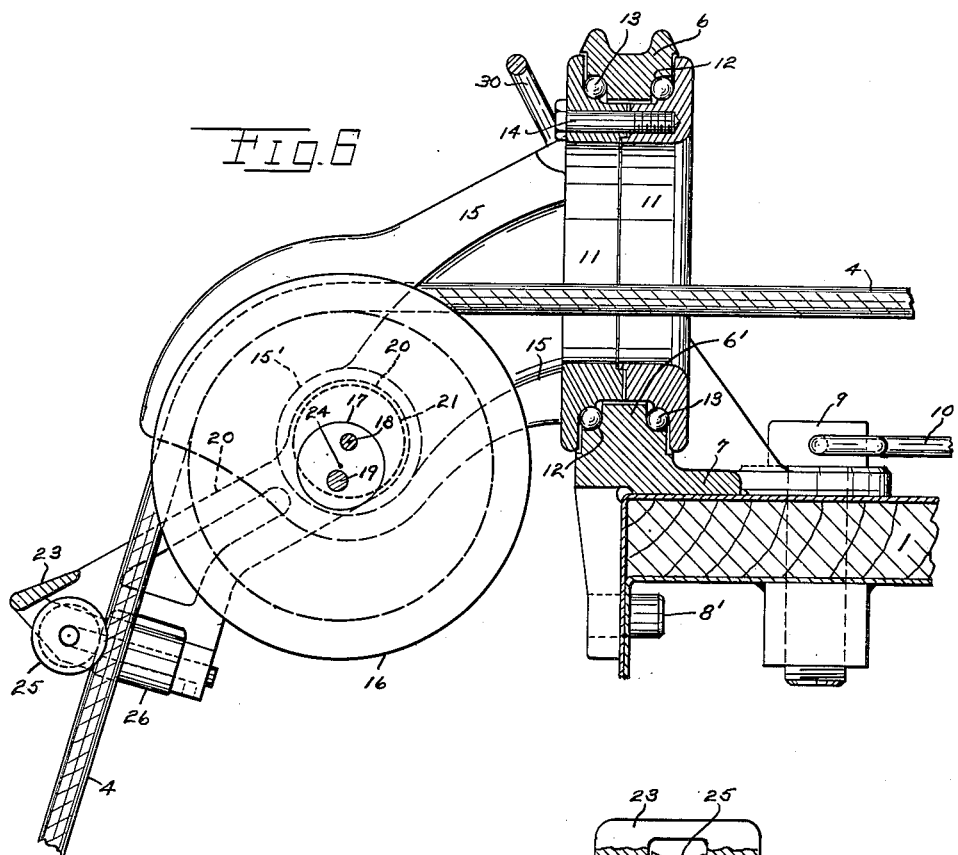
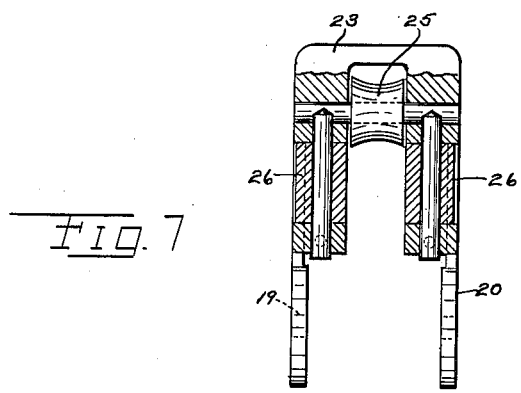

2,630,299

UNITED STATES PATENT OFFICE 2,630,299

CABLE GUIDE

Herman J. Troche, Fairview Village, and James Howard Holan, Rocky River, Ohio, assignors to J. H. Holan Corporation, Cleveland, Ohio, a corporation of Ohio Application July 20, 1949, Serial No. 105,768

20 Claims. (Cl. 254—190)

The invention relates to cable guides and particularly to devices of this character adapted to maintain an accurate feeding of a cable to the groove of a rotatable sheave by controlling the relative positions of the latter and a guiding roller cooperating with the sheave, irrespective of the offset location of the load above or below the plane in which the cable passes from the winding drum or other cable-retrieving device to the sheave. In the accompanying drawings the guiding roller is shown as a grooved formation.

In the form of the invention shown in the accompanying drawings the sheave, in addition to being rotatable about a central horizontal axis, is also pivotally mounted as a whole adjacent its periphery on an axis transverse to its axis of rotation, and offset from the axis of a rotatable bracket carrying the sheave, the pivotal axis being substantially tangential to the portion of the groove of the sheave engaged by the cable as the latter is received from and fed to the winding drum or other retrieving element. Thus, the invention is capable of pivotally turning the sheave with its guide roller and maintaining the cable-engaging portion of the sheave in alignment with a cable load angularly related to the plane of the sheave in its normal position as well as controlling the relative positions of the sheave and guiding roller as above-mentioned when the load is above or below the plane in which the cable engages the groove of the sheave.

The invention is particularly adapted for use with equipment designed for the installation and maintenance of utility properties such as telephone lines, power lines, etc.

It is well known practice for public utility companies to mount a power driven winch on the forward end of the floor of an automotive truck, upon a drum of which winch the work-operating cable is wound, this cable passing rearwardly of and through the truck body and engaging a rotatable sheave mounted on and projected from the rear of the body and thence being paid out to the load via engagement with a guide roller whose frame is pivotally supported on the shaft upon which the sheave rotates, the guide roller being adjacent to and in alignment with the groove of the sheave.

It is also well known practice to provide supporting arms for the sheave having a forwardly extended hub portion rotatably mounted in a support secured to the truck so that the sheave can be turned by the pull of the load upon an upper pivotal axis offset from the axis of the hub portion and substantially tangential to the cable-engaged section of the sheave, thus to keep the groove of the latter in alignment with the angular offset of the work from the plane of the sheave, the hub having an opening through which the cable passes from the winch to the groove of the sheave.

The instant invention is particularly concerned with cable guide means whereby the whole cable guide assembly acts to turn or steer the complete unit in the main support so that, in addition to the above-mentioned angular adjustment, the guide roller is maintained in such position relative to the sheave groove as to pass the cable to the sheave groove with the same accuracy as is true in the normal position of the sheave, irrespective of the particular height, relative to the normal path of travel between the guide roller and the sheave groove, of the end of the cable secured to the work.

Generally speaking, the improvements comprise a rotatable mounting of the sheave on a spindle which has cam sides to which are secured the guiding roller frame, the cam sides being rotatably mounted in the rotatable bracket, and the spindle and the guiding roller frame having a pivotal movement as a unit, incident to the rotation of the cam sides, whereby the load pull upon the cable traversing the sheave groove will turn the hub, the rotatable bracket, and the elements carried thereby, around the axis of the support, according to the angular position of the load, and will turn the unit, including the guiding roller frame, on its pivotal axis to maintain a selective position of the guide roller relative to the sheave groove irrespective of the extent and height of the load either above or below the section of the sheave groove engaged by the cable.

The members, hereinafter fully described, which act as cam sides for the spindle are discs 21 and have centers which are eccentric to the spindle center and set up a moment. This moment brings the guide roller into contact with the cable which, as hereinafter fully described, is engaged by the lower or inside surface of the guide roller. Thus, there is a camming action which produces a pressure to hold the guide roller in contact with the cable.

In fact, it will be noted from the detail description hereinafter given that the adjustments are being continually made and that many factors induce these adjustments including the weight of the cable, height and angularity of cable attachment to the load, load pull, operating factors, etc. In fact, the cable guide mechanism is constantly catching up with itself in accordance with the stresses induced by these several factors.

The annexed drawings and the following description present in detail certain means illustrating our improvements in cable guides, the same showing and describing, however, only one form of assembly in which the invention may be embodied.

In said annexed drawings:

Figure 1 is a plan view of an automotive truck to which the instant improvements are applied;

Figure 2 is a side view, partially in vertical section, upon an enlarged scale, of the rear end of the truck and the improved cable guide mechanism secured thereto;

Figure 3 is a plan section, upon a still larger scale, taken in the plane indicated by the line 3—3, Figure 2;

Figure 4 is a top plan of the elements shown in Figure 2;

Figure 5 is a rear elevation, this view also suggesting in broken lines, on the left side thereof, a movement of the sheave as a whole on a pivotal axis to a position at right angles to its normal position and, on the right side of the figure, a movement of the sheave on its pivotal axis and also a camming movement of the spindle, the position shown being when the load engaged is angularly related to the plane of the sheave in its normal position and is below the groove of the sheave in its normal position relative to the groove of the guide roller;

Figure 6 is a view, similar to Figure 2, partially in vertical section but on a larger scale, showing the relative positions of the several parts of the mechanism when the load is below the engaged groove section of the sheave but in the normal plane thereof, the planes of the section being indicated by the line 6—6, Figure 4; and Figure 7 is a fragmentary vertical section, upon an enlarged scale, taken in the plane indicated by the line 7—7, Figure 4.

Referring to the annexed drawings in which the same parts are indicated by the same respective numbers in the several views, the cable guide assembly 2, Figure 1, is shown as being mounted on the rear end of an automotive truck 1, there being mounted at the forward end and on the floor of the truck 1 a power-driven winch 3 for reeling the cable 4 on a drum 5. The cable 4 passes from the drum 5 rearwardly of and within the body of the truck 1 and outwardly of the rear end thereof to the groove 22 of a sheave 16 rotatable on a horizontal axis 24, whence the cable 4 passes to a guide roller 25 and thence to the work. The cable 4 from the drum 5 to the sheave groove 22 travels substantially in a horizontal plane and thus engages the groove 22 substantially tangentially and thence, in the illustrative form of the invention shown, passes substantially in the same horizontal plane to engagement with the bottom of the grooved roller 25 in the normal position of the sheave 16, Figure 2.

The cable guide assembly 2 which is provided with a handle lift 30 is mounted on the rear end of the truck 1 by means of a transverse support 6, Figure 4, formed with a forwardly extended flange 7 which is secured by bolts 9 to the floor of the truck 1, certain wrenches 10 being indicated for this purpose. The support 6 is formed with rear depending ears 8 having forwardly extending pins 8¹ which intersect depending flanges of the floor of the truck 1.

The rear central part of the support 6 is an upwardly extended annular member, Figure 6, which is formed with an inner annular central rib 6¹, Figure 6, merging, front and rear, into ball race surfaces 12 engaged by balls 13 which also engage suitable ball race surfaces formed on and externally of a pair of mated front and back bearing cage member 11 secured together by bolts 14 and thus forming a complete hub which is rotatable within the support 6.

The hub comprised of the cage members 11 forms an opening through which the cable 4 passes from the drum 5 to the sheave 16 and the respective elements are so relatively disposed that the line of the cable 4 is offset from the axis of the hub.

The rear cage member 11 is formed with laterally-spaced pairs of converging wing brackets 15 each of which pairs adjacent its rear end is formed with a hub portion having a bearing surface 15¹ within which a disc 21 is journalled.

The sheave 16 is rotatably mounted on a spindle 17, the axis of the spindle 17, which is the same as the axis of the sheave 16, being indicated by 24, Figures 2 and 6, the spindle 17 being disposed between and abutting the inside faces of the discs 21. A guide roller frame 23 is provided having connected opposed arms 20 between the outer ends of which a guide roller 25 is rotatably mounted. The front free ends of the frame arms 20 are secured together by spaced pins 18 and 19 which intersect the discs 21 and the spindle 17. The pins 18 and 19 thus secure together into one unit the guide roller frame 23, the discs 21, and the spindle 17.

The centers of the discs 21 are eccentric to the center of the spindle 17. This eccentricity sets up a moment or a crank effect which rotates the discs 21 when a load is applied to the sheave 16 consequent to a load pull upon the cable 4. The pin 18, in the form of invention illustrated, is on the far side of the spindle axis 24 relative to the guide roller 25. The pin 19 is on the near side of the spindle axis 24. However, such relative disposition of the pins 18 and 19 is largely a matter of the size of the cable guide, since both pins 18 and 19 might be on the near side of the spindle axis 24 relative to the guide roller 25. The structure described causes the discs 21 to act as cam sides for the spindle 17, this camming action producing a pressure serving to hold the guide roller 25 in contact with the cable 4. In the form of the device shown in the accompanying drawings, the center for the discs 21 is substantially identical with the center upon which the turning movement of the unit comprising the spindle 17, the pins 18 and 19, and the frame 23 takes place. However, such identity of the centers of the discs 21 and the turning unit is not necessary.

The bottom part of the groove of the guide roller 25, in the normal position of the elements, is substantially horizontally aligned with the cable-engaged bottom portion of the top part of the groove 22 of the sheave 16, in the form of device shown in the accompanying drawings. Mounted in the frame 23, Figure 7, adjacently below the roller 25 and laterally thereof upon both sides are opposed auxiliary plain guide rollers 26 rotatable upon vertical axes.

The cable 4 substantially tangentially engages the bottom of the top part of the groove 22 of the sheave 16 and this groove bottom substantially defines a pivotal axis for the sheave 16 transverse to the axis of rotation 24 thereof, upon which pivotal axis the sheave 16 and roller frame 23 will be turned, by reason of the rotatability of the hub 11 in the support 6, when the load is so located that the cable 4 passes from the work to the sheave 16 at an angle to the plane of the sheave shown in Figure 2. Apparatus for producing such pivotal action of the sheave and guide roller, when the work is laterally offset, is well known, and the effect thereof by such apparatus as also by the invention herewith presented is indicated by $16^2$, Figure 5.

However, when the load pull is parallel to the plane of the sheave, the improvements herein set forth provide also for a maintenance of the contacting position of the roller 25 against the cable 4 to insure definite and proper feeding of the cable 4 to the groove 22. This result is effected by the camming action of the discs 21 which form spindle cam sides and act upon the roller frame 23 in the manner illustrated in Figure 6. Governed by the extent of the load on the cable 4 and the inclination of the latter from the engaged portion of the groove 22, the unit assembly consisting of the spindle 17, the pins 18 and 19, the frame arms 20 and the roller 25, with the sheave 16, turns on the center of the pin 18, thus effecting a movement of the roller frame 23. This turning movement takes place irrespective of whether or not the sheave 16 has also been turned on its upper pivotal axis for cable run to a load located laterally of the plane of the sheave 16. The turning movement of this assembly is an arcuate one about the center of the pin 18, and the respective movements of the sheave 16 and the elements of the assembly, viz., the spindle 17, the pins 18 and 19, the roller frame 23, and the roller 25, for one such adjustment, can be readily understood from an inspection of Figures 2 and 6. The swing of the spindle 17 is translated into a proportionate amount of swing of the roller 25 and the moment created by the discs 21 hold the roller 25 against the cable 4. The double adjusting movement of the sheave 16, due both to an angularly-related load and a load located below the plane of the cable-engaged bottom of the groove 22, is illustrated by $16^1$, Figure 5, wherein the sheave 16 has been turned upon its upper pivotal axis to accommodate the angularly offset load pull, and the cam sides 21 have also performed their function of effecting a pivotal movement of the frame arms 20 upon the axis of the pin 18 to maintain the guide roller 25 in its selected position relative to the sheave groove 22, the spindle 17 and the pin 19 partaking of this pivotal movement.

As above stated, the improved cable guide assembly is constantly catching up with itself in accordance with the continuously changing stresses occasioned by the many factors tending to produce the adjustments. Thus, the assembly is self-compensating for different directional loads.

What we claim is:

1. In a cable guide assembly, a sub-combination for maintaining the position of a guide roller relative to a sheave according to the pull of the load in a plane parallel to the plane of the sheave comprising a stationary bracket, a grooved sheave, a spindle upon which the sheave is rotatably mounted, a frame having a pivotal turning movement relative to the bracket and having connected opposed arms carrying a guide roller adjacent its swinging end, the guide roller being selectively positioned relative to the sheave groove, a pin eccentrically intersecting the spindle on the far side of the axis of the latter relative to the roller, disks rotatably mounted in the bracket upon both sides of the spindle and eccentric to the spindle axis, and a second pin eccentrically intersecting the spindle upon the near side of its axis relative to the roller, said second pin intersecting said disks and being secured to the arms.

2. The combination in a guide assembly for feed of a cable to a rotatable grooved sheave, in which the sheave is mounted in a rotatably mounted sheave bracket for pivotal movement on an axis adjacent the edge of the sheave, said axis being transverse to the axis of rotation of the bracket and offset from said axis of rotation and in which the cable is paid out and retrieved along the groove of the sheave, of opposed disks rotatably carried by the bracket, a spindle intermediate the disks and upon which the sheave is rotatable, a pin intersecting the spindle and upon which the disks are centrally mounted, a second pin intersecting the spindle and the disks eccentric to their axes to cause the disks to function as cam sides for the spindle, spaced arms secured to the pins, and a guide roller mounted in said arms in alignment with the groove of the sheave, the first-mentioned pin being on the far side of the spindle axis and the second-mentioned pin being on the near side of the spindle axis, relative to the roller, whereby the load pull upon the cable traversing the sheave groove will move the guide roller in amounts governed by the extent and directional pull of the load and in maintained position relative to the sheave groove.

3. A guide assembly for feed of a cable to a rotatable grooved sheave mounted for pivotal movement on an axis adjacent the edge thereof and transverse to the rotatable axis of the sheave, in which there is a rotatably mounted sheave bracket having an axis offset from the pivotal axis of the sheave, and in which the cable is paid out and retrieved along the groove of the sheave, comprising opposed rotatable members journalled in the bracket, a spindle intermediate the rotatable elements and upon which the sheave is rotatable, a roller frame, a guide roller mounted in the outer end of the frame in selective alignment with the sheave groove, a pin secured to the frame and intersecting the rotatable elements and the intermediate spindle and providing an axis of rotation for the elements and an axis of turning movement for the spindle eccentric to its central axis and on the far side of the latter relative to the guide roller, a second pin secured to the frame and intersecting the rotatable elements and the spindle eccentrically to the axis of the latter and upon the side of said spindle axis opposite to that intersected by the first-mentioned pin, whereby a load pull upon a cable traversing the sheave groove and angular to the plane of the sheave will turn the sheave on its pivotal axis and a load pull parallel to the plane of the sheave will effect a camming action by the rotatable elements upon the frame, all to maintain the guide roller in alignment with the sheave groove.

4. In a cable guide assembly, a sub-combination for maintaining the position of a guide roller relative to a sheave according to the pull of the load in a plane parallel to the plane of the sheave comprising a bracket, a grooved sheave, a spindle upon which the sheave is rotatably mounted, members rotatably mounted in the bracket laterally of the side faces of the spindle, a frame carrying a guide roller selectively positioned relative to the sheave groove, the frame having arms in and between which the roller is mounted, a pin offset from the spindle axis and intersecting the spindle and the rotatable members upon the near side of the spindle relative to the roller, the pin being secured to the frame arms, and a second pin parallel to the first-mentioned pin and at a distance from the axis of the guide roller greater than the first-mentioned pin, said second pin eccentrically intersecting the spindle, providing an axis of rotation for the rotatable members, and being secured to the frame arms, whereby a load pull of the cable upon the sheave in a plane parallel to a face of the sheave results in a camming action of the rotatable members upon the frame to effect a pivotal movement thereof to maintain the position of the roller relative to the sheave groove.

5. A cable guide assembly, characterized as in claim 4, in which the bracket is rotatably mounted on an axis transverse to the spindle axis and offset from the line of cable engagement with the sheave groove, whereby the position of the guide roller relative to the sheave groove is maintained irrespective of the directional pull of the load.

6. A cable guide assembly, characterized as in claim 4, in which the bracket is rotatably mounted upon an axis substantially right angular to the spindle axis, the bracket axis being offset from the line of cable engagement with the sheave groove, whereby the position of the guide roller relative to the sheave groove is maintained irrespective of the directional pull of the load.

7. In a cable guide assembly, a sub-combination for adjustment of a guide roller in a plane parallel to the plane of a cable sheave comprising a stationary bracket, a sheave having a cable-carrying surface, a spindle upon which the sheave is rotatably mounted, a frame carrying a roller adjacent the cable-carrying surface of the sheave, members rotatably mounted in the bracket adjacent the two side faces of the spindle, means secured to the frame and securing the members and spindle together and providing an axis of rotation for the members and an axis for pivotal movement of the spindle, and other means secured to the frame upon the near side of the spindle axis relative to the roller and securing the members and spindle together eccentrically to the axis of rotation of the member, the last-mentioned means, when a load is applied to the sheave right-angularly to its rotatable axis, effecting, through the pivotal movement of the spindle and the rotation of the members and the consequent camming action upon the frame, an arcuate movement of the roller around the cable-carrying surface of the sheave.

8. In a cable guide assembly, a sub-combination for maintaining a guide roller in a desired position relative to the cable-carrying surface of a rotatable sheave, in response to movements of the sheave consequent to loads thereon in a plane at right angles to its axis, comprising a sheave, a frame, and a rotatable guide roller carried by the frame and aligned with the sheave for cooperative feed of a cable, of means for moving the roller in an arcuate path around the cable pathway on the sheave to maintain pressure of the roller on the cable, in accordance with the load pull in a plane parallel to the plane of the sheave, comprising a stationary bracket, a spindle, the spindle having a main portion upon which the sheave is rotatably mounted and eccentric portions serving as cam sides of the spindle, the eccentric portions being rotatably mounted upon the bracket, a pin secured to the frame, intersecting the main portion of the spindle eccentrically, and providing a pivotal axis for the latter, and a second pin secured to the frame between said first-mentioned pin and the roller, the second pin intersecting the spindle eccentrically of its main portion upon the roller side of the axis thereof.

9. In a cable guide assembly, characterized as in claim 8, in which the eccentric spindle portions are separate members laterally adjacent to the main portion and serving as cam sides of the spindle and in which the second pin also intersects said cam sides of the spindle eccentrically.

10. In a cable guide assembly, characterized as in claim 8, in which the first-mentioned pin intersects the eccentric portions of the spindle centrally to provide an axis of rotation therefor.

11. In a cable guide assembly, characterized as in claim 8, in which the eccentric portions of the spindle are rotatably mounted in the bracket and in which the first-mentioned pin intersects the eccentric portions of the spindle centrally to provide an axis of rotation therefor.

12. A cable guide assembly comprising a bracket, a sheave, a spindle upon which the sheave is rotatably mounted, members rotatably mounted on the bracket, a frame carrying a rotatable guide roller adjacent one end selectively positioned relative to the cable pathway on the sheave, a pin intersecting the members and spindle and providing an axis of rotation for the members and an axis of pivotal turning movement for the spindle, the frame being pivotally mounted adjacent its opposite end relatively to the bracket and a second pin secured to the frame in a plane intermediate the roller and the pivotal axis of the frame, said second pin eccentrically intersecting the rotatable members and the spindle, whereby a load pull of the cable in the plane of the sheave effects a pivotal movement of the spindle on the first-mentioned pin and a consequent camming action of the rotatable members upon the frame to maintain the position of the roller.

13. A cable guide assembly, characterized as in claim 12, in which the first-mentioned pin is secured to the frame and provides the pivotal axis for the latter on the bracket.

14. A cable guide assembly for maintaining alignment of a grooved sheave and a cooperating guide roller comprising a support, a unitary bracket having a hub portion rotatable in the support, a grooved sheave, means paying out and retrieving a cable to and from the sheave groove along a pathway eccentric to the axis of the hub, the sheave being mounted on the bracket and having a pivotal movement on an axis parallel to the groove thereof as a consequence of the rotatable movement of the bracket, members rotatably mounted on the bracket adjacent the faces of the sheave, a frame carrying a guide roller cooperatively positioned with the sheave groove for cable feed, the frame being pivotally mounted on the bracket, a spindle having its axis transverse to the hub axis and upon which the sheave is rotatably mounted, a pin secured to the frame and eccentrically intersecting the rotatable members and the spindle, said pin being disposed on the near side of the axes of the rotatable members and the spindle relative to the roller, and means providing a pivotal axis for the spindle, the pivotal mounting of the frame and the pivotal axis of the spindle being disposed on the far side of the spindle axis relative to the roller.

15. A cable guide assembly for controlling alignment of a grooved sheave and a cooperating guide roller, characterized as in claim 14, in which the axis of the rotatable sheave is substantially relatively right angular to the axis of the hub, and in which the means providing a pivotal axis for the spindle is a second pin intersecting the latter and secured to the frame to provide a pivotal mounting for the latter on the bracket.

16. A cable guide assembly for controlling alignment of a grooved sheave and a cooperating guide roller, characterized as in claim 14, in which the frame has opposed arms, and in which the pin is secured to both arms of the frame and eccentrically intersects both rotatable members.

17. A cable guide assembly for controlling alignment of a grooved sheave and a cooperating guide roller, characterized as in claim 14, in which the axis of the spindle is substantially relatively right angular to the axis of the hub, in which the frame has opposed arms, in which the pin is secured to both arms of the frame and eccentrically intersects both rotatable members, and in which a second pin provides the pivotal axis for the spindle, said second pin being secured to the frame arms and providing the pivotal mounting therefor on the bracket, said second pin centrally intersecting the rotatable members and providing a rotatable axis therefor.

18. In a cable guide assembly, a sub-combination for maintaining the position of a guide roller relative to a sheave according to the pull of the load in a plane parallel to the plane of the sheave comprising a stationary bracket, a cable-carrying sheave, a spindle upon which the sheave is rotatably mounted, a frame having opposed arms connected at one end and carrying a guide roller for feeding a cable to the sheave, a pair of discs rotatably mounted in the bracket upon opposite sides of the spindle, a pin eccentrically intersecting the spindle on the far side of the axis of the latter relative to the roller, said pin providing a center of rotation for the discs and being secured to and adjacent the opposite ends of the frame arms, and a second pin eccentrically intersecting the spindle upon the near side of its axis relative to the roller, said second pin intersecting said discs and being secured to the frame arms intermediate the ends of the latter.

19. In a cable guide assembly, a sub-combination for maintaining the position of a guide roller relative to a sheave according to the pull of the load in a plane parallel to the plane of the sheave comprising a stationary bracket, a spindle having a main portion and side portions, the side portions being journalled in the bracket and rotatable on an axis eccentric to the axis of the main spindle portion, a cable-carrying sheave rotatably mounted on the main spindle portion, a pivotally-mounted frame carrying a guide roller adjacent one end, the roller being aligned with the cable-carrying surface of the sheave, a pin in the main portion of the spindle providing an axis of pivotal turning movement therefor, the pin being on the far side of the spindle axis relative to the roller, and a second pin intersecting the main portion of the spindle on the near side of the spindle axis, said second pin being secured to the roller-carrying frame intermediate the roller and the pivotal mounting of the frame.

20. In a cable guide assembly, a sub-combination for maintaining the position of a guide roller relative to a sheave according to the pull of the load in a plane parallel to the plane of the sheave comprising a stationary bracket having opposed wings, a grooved sheave, a spindle upon which the sheave is rotatably mounted between the bracket wings, a frame having opposed arms, a guide roller rotatably mounted between the arms of the frame and having a cable groove opposed to the groove of the sheave, discs rotatable in the respective bracket wings upon an axis eccentric to the spindle axis, a pin secured to the opposed arms on the near side of the spindle axis relative to the roller, said pin eccentrically intersecting the discs and the spindle, and a second pin spaced from the first pin intersecting the spindle eccentrically to the axis of the latter, said second pin being secured to the opposed frame arms.

HERMAN J. TROCHE.
JAMES HOWARD HOLAN.

REFERENCES CITED

The following references are of record in the file of this patent:

UNITED STATES PATENTS

| Number | Name | Date |
| --- | --- | --- |
| 676,143 | Mackrow et al. | June 11, 1901 |
| 690,965 | Jones | Jan. 14, 1902 |
| 996,803 | Schnoor | July 4, 1911 |
| 1,103,055 | King et al. | July 14, 1914 |
| 1,598,802 | Brown | Sept. 7, 1926 |
| 1,657,187 | Whittlesey | Jan. 24, 1928 |
| 1,769,411 | Bennett | July 1, 1930 |
| 1,790,752 | Kaiser | Feb. 3, 1931 |
| 2,343,894 | Fisher | Mar. 14, 1944 |